(12) United States Patent
Stewart

(10) Patent No.: US 8,091,279 B2
(45) Date of Patent: Jan. 10, 2012

(54) MULTIPLE SELF WATERING CONTAINER SYSTEM

(76) Inventor: Donald J. Stewart, Merced, CA (US)

( * ) Notice: Subject to any disclaimer, the term of this patent is extended or adjusted under 35 U.S.C. 154(b) by 547 days.

(21) Appl. No.: 12/152,105

(22) Filed: May 9, 2008

(65) Prior Publication Data

US 2010/0192463 A9    Aug. 5, 2010

Related U.S. Application Data

(60) Provisional application No. 60/917,036, filed on May 9, 2007.

(51) Int. Cl.
*A01G 27/04* (2006.01)
*A01G 31/06* (2006.01)

(52) U.S. Cl. ................................. 47/81; 47/60

(58) Field of Classification Search .......... 47/79, 81–83, 47/59 R, 60, 61, 62 R
See application file for complete search history.

(56) References Cited

U.S. PATENT DOCUMENTS

| | | | | |
|---|---|---|---|---|
| 3,298,133 A | * | 1/1967 | Courtright | 47/61 |
| 3,849,932 A | * | 11/1974 | Adams | 47/73 |
| 4,213,274 A | * | 7/1980 | Skaife | 47/81 |
| 4,287,682 A | * | 9/1981 | Browne | 47/81 |
| 4,324,070 A | * | 4/1982 | Swisher | 47/81 |
| 5,172,516 A | * | 12/1992 | Maillefer | 47/80 |
| 5,782,035 A | * | 7/1998 | Locke et al. | 47/79 |
| 5,806,242 A | * | 9/1998 | Park | 47/81 |
| 5,921,025 A | * | 7/1999 | Smith | 47/79 |
| 6,389,751 B1 | * | 5/2002 | Wang | 47/81 |
| 6,401,387 B1 | * | 6/2002 | Diloreto et al. | 47/66.6 |
| 6,612,073 B1 | * | 9/2003 | Powell et al. | 47/83 |
| 6,880,484 B1 | * | 4/2005 | Lee | 119/74 |
| 7,712,255 B1 | * | 5/2010 | Klessig | 47/83 |
| 2002/0100214 A1 | * | 8/2002 | Stewart | 47/82 |
| 2005/0268551 A1 | * | 12/2005 | Lai | 47/81 |
| 2006/0112634 A1 | * | 6/2006 | Vogt | 47/81 |
| 2007/0089366 A1 | * | 4/2007 | Kasatshko | 47/81 |
| 2007/0180766 A1 | * | 8/2007 | Wilkes | 47/83 |
| 2007/0186469 A1 | * | 8/2007 | Keats | 47/83 |
| 2008/0216403 A1 | * | 9/2008 | Schmidt et al. | 47/83 |
| 2009/0056220 A1 | * | 3/2009 | Dipaolo et al. | 47/79 |
| 2009/0064576 A1 | * | 3/2009 | Sugarek | 47/81 |
| 2010/0043285 A1 | * | 2/2010 | Kelty | 47/81 |

* cited by examiner

*Primary Examiner* — Son T Nguyen
(74) *Attorney, Agent, or Firm* — Temmerman Law Office; Mathew J. Temmerman

(57) ABSTRACT

A multi container system of at least one each of the first container, and at least one second and at least one third container, each of which has a chamber therein. The first container has a water retaining chamber with water input and water output as well as a water self leveling means. The second container has a water transfer chamber in which a wicking tray loaded with a wicking medium is placed, preferably on a drainage tray, said medium being used to transfer the water to the plants disposed in a third container's plant receiving chamber. The container #3 nests within the water transfer chamber of container #2, to receive water therefrom by capillary action. Container #1 is fluidly connected to a first container #2 for water transfer, and a series of containers #2 may be linked, as space limitations and grade permit, or as may be desired.

21 Claims, 5 Drawing Sheets

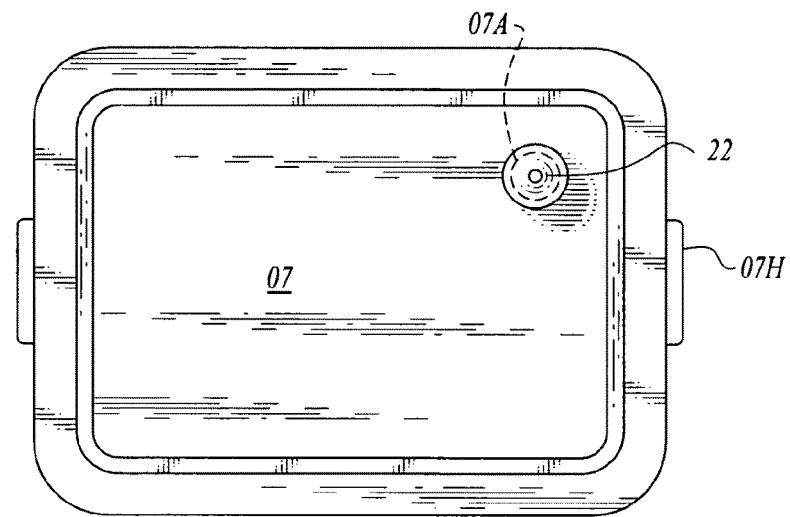
*Fig. 1*
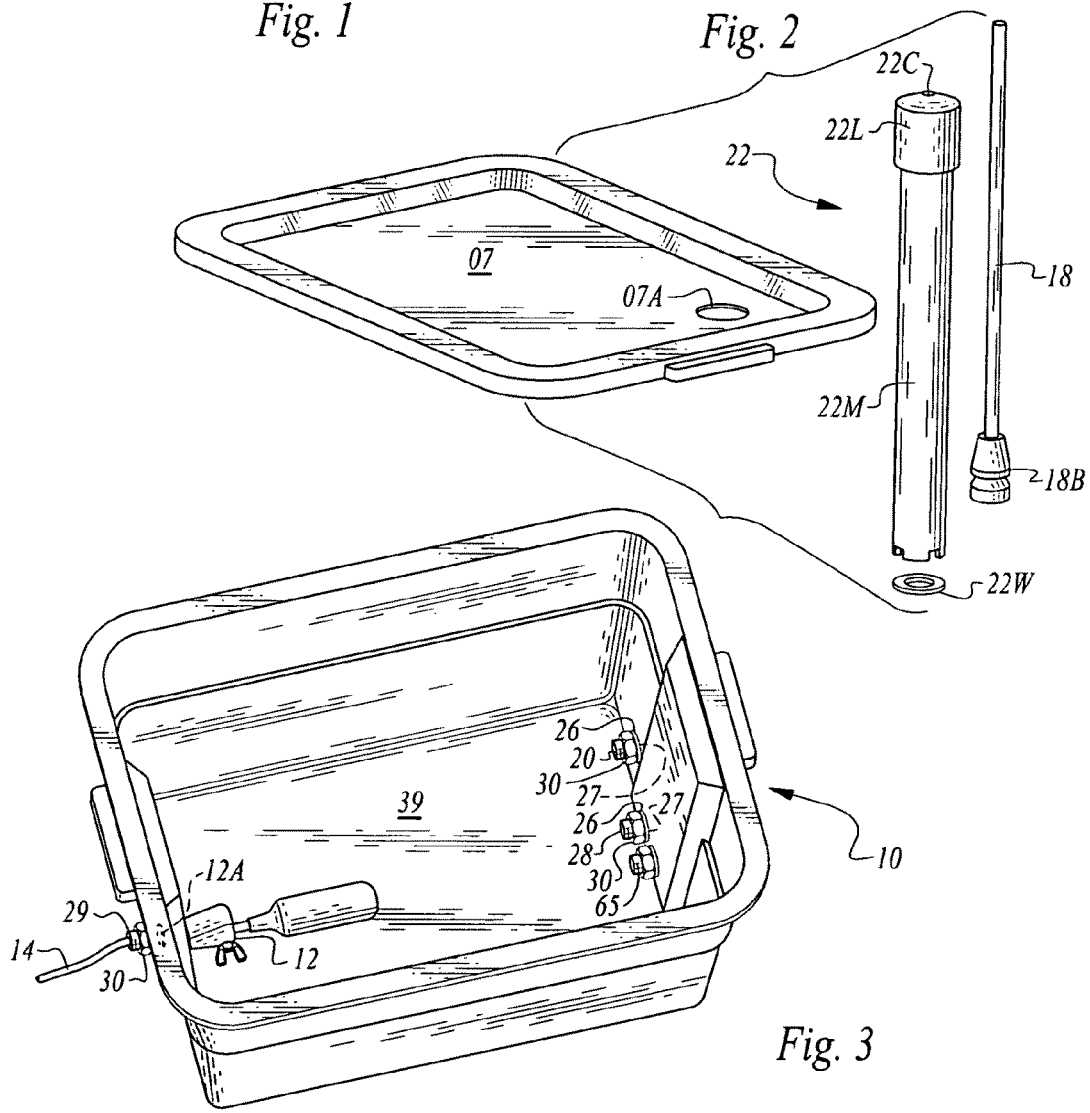
*Fig. 2*
*Fig. 3*

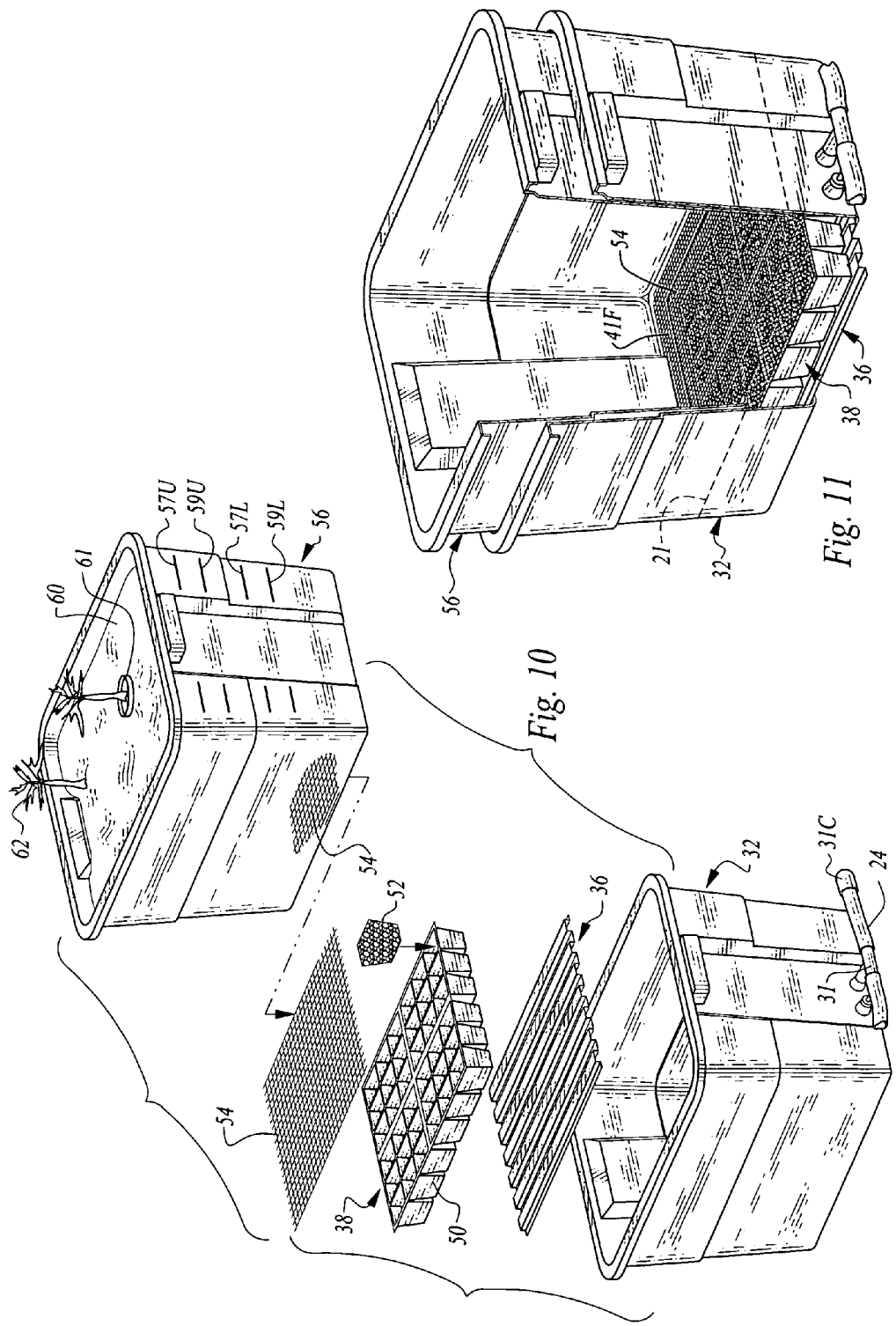

MULTIPLE SELF WATERING CONTAINER SYSTEM

This patent application claims priority from provisional patent application No. 60/917,036 filed May 9, 2007.

FIELD OF INVENTION

This invention relates to a multiple plant container self watering system, wherein the level of water in each container is preferably kept uniform.

BACKGROUND OF THE INVENTION

Self watering systems for both plants and Christmas trees are known to the art. Thus mention can be made of the U.S. Pat. Nos. to Main et al 6,497,071; and to Copenhaver 5,369,900; which relate to Christmas trees; while Buss, 6,357,179; Colovic 6,079,156; and Lishman 5,020,261; are typical examples of the prior art that relate to the self watering of plants and planters.

The present invention, which is in the category of a plant watering system, enjoys the benefits of being both low cost and expandable to suit the owner or the physical space available and is easily transportable form location to location should the owner move. It can, be utilized with or without a timer, and with a finite amount water source such as a barrel or a controlled but unlimited amount water source such as a hose. Because of the nature of the water transfer aspect of the system, plants that require differing amounts of water can be kept together. Thus the plants are able to draw water according their individual needs such that there is no need to adjust the flow of water to the varying needs of each individual plant as is required in a drip system or other prior art.

DEFINITIONS

The word "reservoir" as used herein is intended to refer to a barrel, bucket or other large vessel utilized as the water source for the first container of this invention.

The term "media protection sheet" is intended to refer to a metal or plastic screen, such as but not limited to similar to fly screening or geo textile that is glued over the top of the wicking tray portion to retain the wicking medium in the tray.

The word "line" may be used as a synonym for tubing.

The "wicking assemblage" is a wicking tray loaded with wicking medium and covered over by screening.

SUMMARY OF THE INVENTION

A multi container system is disclosed wherein the first container is a water retaining chamber having water leveling capability, which container has a water input and a water output as well as a water self leveling means. The second container includes a water transfer chamber in which a wicking means is present to transfer the water to the plants. The third container has a plant receiving chamber, which chamber nests within the water transfer chamber for receiving water therefrom. Chamber 1 is fluidly connected to a first chamber 2 for water transfer, and a series of chambers number 2 can be linked daisy chain style as space limitations permit or as may be desired by the owner.

It is a first object to provide a new low cost, easy to use self watering container system.

It is a second object to provide container system that can be expanded to any number of containers limited only by water input capability.

It is a third object to provide a self watering system that employs capillary action.

It is a forth object to provide a self watering multi-container system that employs different size containers with the same water retaining chamber.

It is a fifth object to provide a self watering system that achieves an even distribution of water throughout the entire growing medium.

It is a sixth object of this invention to provide a self watering system which gives the user control over the moisture content available to the plants in each individual container.

Other objects of the invention will in part be obvious and will in part appear hereinafter.

The invention accordingly comprises the device possessing the construction, combination of elements and arrangement of parts, which are exemplified in the following detailed disclosure, and the scope of the application of which will be indicated in the claims.

For a fuller understanding of the nature and objects of the invention, reference should be made to the following detailed description taken in conjunction with the accompanying drawings.

BRIEF DESCRIPTION OF THE FIGURES

FIG. 1 is a top plan view of the first container with a portion of the water level indicator seen disposed therein.

FIG. 2 is side perspective view of the cover of the first container, and an exploded view of the elements of the water depth indicator.

FIG. 3 is a top perspective view of the first chamber of this invention.

FIG. 10 is an exploded view of the various components being assembled together.

FIG. 11 is a cutaway view of the fully assembled apparatus of FIG. 10.

DESCRIPTION OF THE PREFERRED EMBODIMENT

Figure 4:
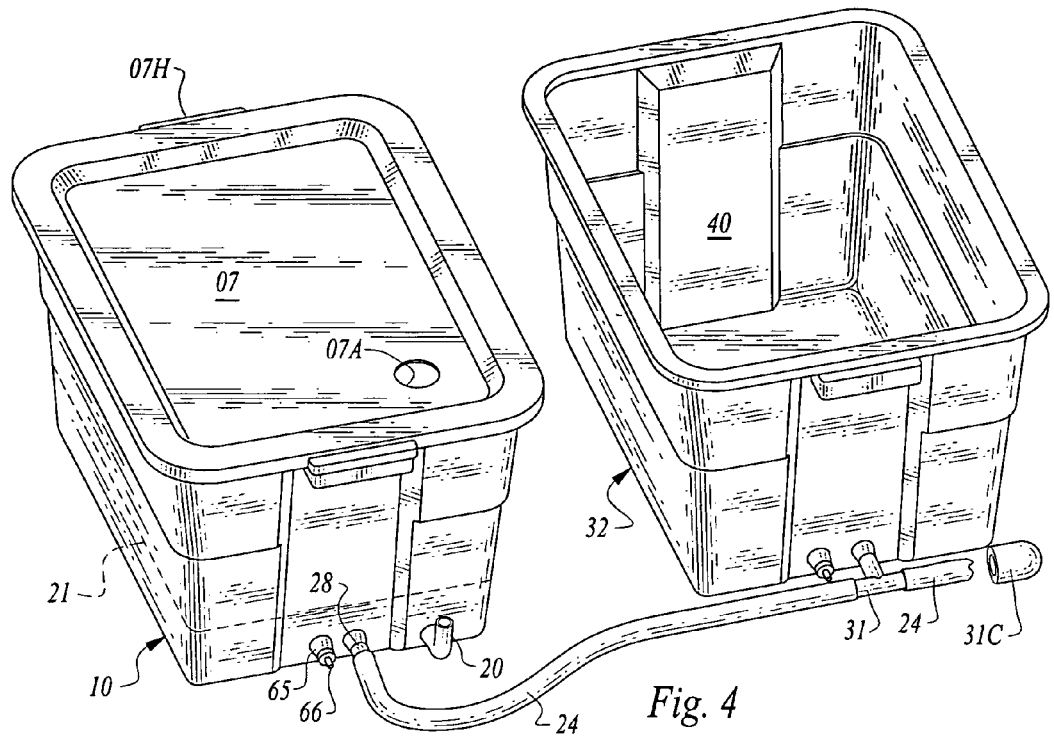
FIG. 4 is a front perspective view of the first and second containers fluidly connected together.

The discussion commences with FIG. 1, where there is shown a plastic lid, 07, having an aperture, 07A, therethrough at a suitable location. A portion of the water level gauge, 22, is shown to be disposed in said aperture. Lid, 07, may include one or more handles, 07H. Here, two such handles are seen. Not visible in this figure is water transfer line, 21, and level adjusting elbow, 20, of the container #1, the water level control container, covered by the lid, 07. More will be set forth concerning these last two elements infra.

In FIG. 2, water container 10's lid, 07, with its aperture, 07A, is seen. Disposed adjacent the lid, 07, is the water level gauge, 22, which comprises the following elements: a cap, 22L, of a slightly larger diameter than tube, 22M, is shown disposed on one end of 22M. Cap, 22L, has a central opening, 22C, through which the tube, 18, can rise. The other end of tube, 22M, may be opened or covered over preferably by a washer, 22W, having a central opening slightly wider than that of level tube (or rod) 18, which level tube is approximately ¼" in diameter. A circumscribing non-water absorbing bulb, 18B, is attached to the lower end of tube, 18, while the upper end of tube, 18, remains uncovered. When installed in a water containing chamber, tube 18's base, 18B, will float while part of the tube, 18, projects through the opening, 22C. Tube/rod, 18, may carry indicia to give a measurement of the height of the water in the first container's chamber.

In FIG. 3, container #1 the water level container, 10, having a chamber, 39, for water retention is seen. Two grommets, 26, are seen on one interior end face of container, 10, These each overlay a throughbore, 27, in one of which is a high water level controller, 20, comprising an elbow that is rotatable within the throughbore for water level adjustment, that is to limit the maximum elevation of the water in the container. This elbow is also useful during a back flushing operation as will be discussed infra. In the other grommet, is a tubular nipple, 28, or coupling device to which tubing can be attached. Both the controller, 20, and the nipple may be formed from plastic parts available in the marketplace for use by drip system installers. The elevational placement of the highwater level controller, 20, and that of the nipple, 28, relative to the bottom of the chamber, 39, should be as close to the container bottom as is physically practical.

On the other end face of the container, 10, a water supply hose, 14, such as of ¼" diameter is connected at the end not seen to a water source such as rain barrel or a hose bib. The end seen of 14, in FIG. 3 is connected to a nipple, 29, of a smaller diameter than ⅝" to ¾" nipple, 28. The nipple, 29, may be of ½ inch outside diameter. It is retained in position by a nut, 30, preferably of Delrin® plastic.

Nipple, 29, is connected to a float valve, 12, which has an exit aperture, 12A, not seen due to being on the underside of the installed valve, for the output of incoming water into chamber 39. Such float valves are readily available in the marketplace and their use and operation is well understood, in that at a preset point, as the water rises, the float rises until the set point at which the opening, 12A, closes to prevent further input of fluid, here water.

In FIG. 4, the exterior of container #1, the water level control container, 10, is seen. If a Rubbermaid brand vessel is employed, it is formed with a slightly wider higher upper section to facilitate nesting. The high water level 21, is equivalent to the water elevation in container #2, where water would contact the base of the growing container and flood the growing medium of the plants.

Shown adjacent to the #1 container, 10, is the #2 container, 32, the water reservoir container, which is fluidly connected by tubing, 24, thereto as is shown from a review of FIG. 4. The tubing is attached to nipple, 28, on one end and to tee, 31, which tee could be an elbow at the end with a cap, 31C, thereon, where no more container #2s, with their interior chamber, 40, are daisy chained together. If a second or more container #2s were to be attached, another segment of tubing, 24, would replace cap, 31C. Note that the elevation of tee, 31, is the same as the nipple, 28, in order not to fight gravity. All of the second chambers receive fluid from the one first container water output line.

The relief port, 20, which is an open elbow serves to limit the height of the water in container #1, before excess drains out. As can be seen, there are no other openings in container #2. While a third opening of a similar nature is shown in FIG. 3, and designated 65, it is unused, and is present only in case a different diameter tubing, smaller or larger, is to be utilized. Otherwise this opening remains closed off by a plug, 66, shown in FIG. 4.

Figure 5:
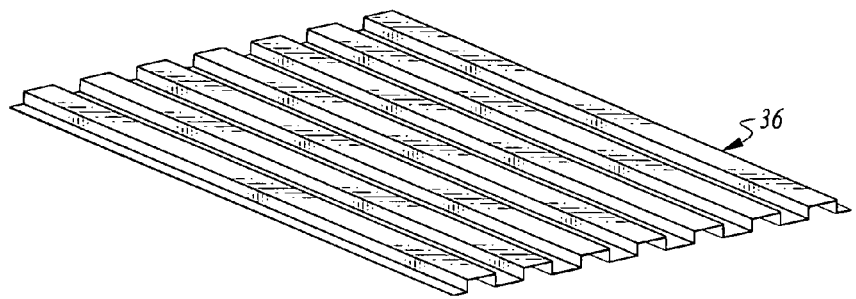
FIG. 5 is a top perspective view of the drain tray employed with this invention.

FIG. 5 depicts in front perspective, the optional drain tray, 36. It is a thermoformed sheet of flexible plastic, usually filled with carbon black for rigidity, having peaks and valleys, and upon which will rest a wicking tray, 38, to be described infra. The purpose of this configuration is to permit water to easily flow under the wicking tray shown in FIGS. 6A, 6B, and 6C. It also serves to keep the bottom of the tray, 38, at a low water level to ensure that all containers #2 begin a dry down simultaneously, that is ensuring capillary action is ended for all the containers, regardless of differing rates of water usage by the plants in the containers #3.

Figure 6A:
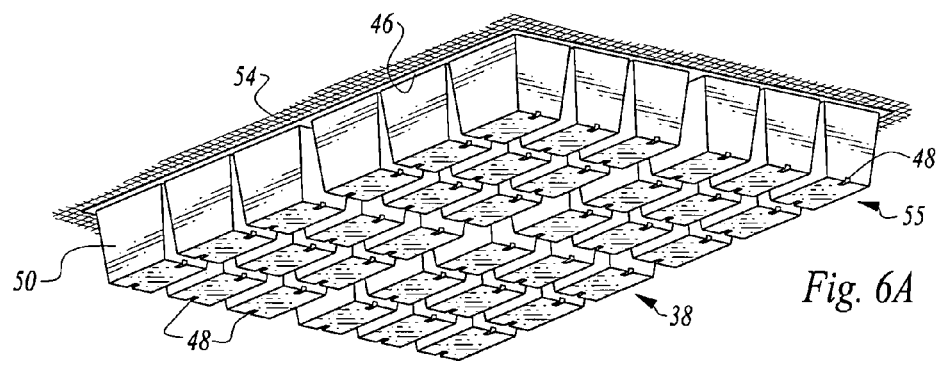
FIG. 6A is a bottom perspective view of the wicking tray of this invention.
Figure 6B:
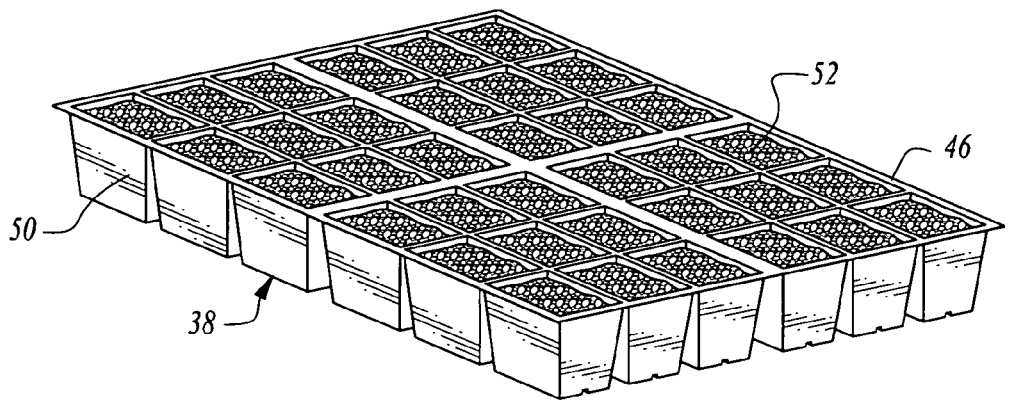
FIG. 6B is an end perspective view thereof.
Figure 6C:
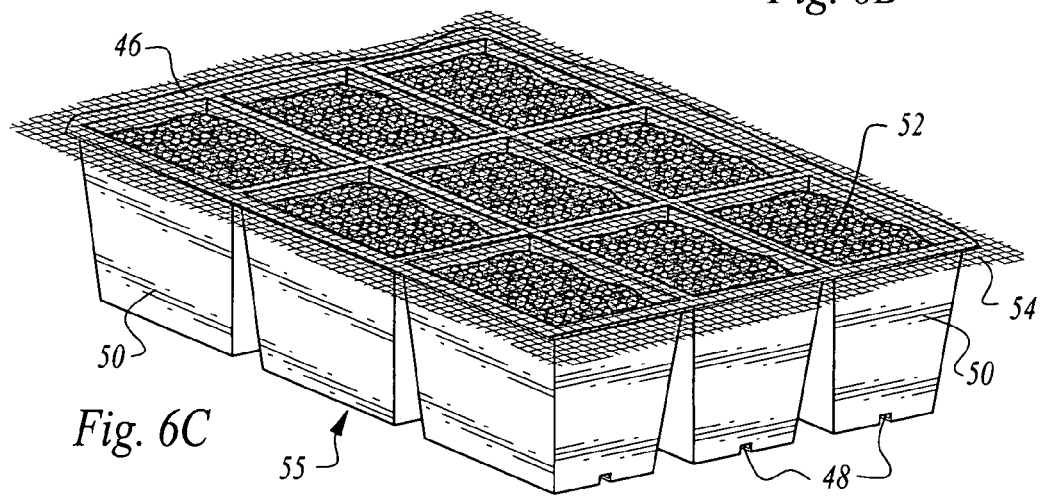
FIG. 6C is a perspective view of the wicking tray covered with a medium protection sheet.

FIG. 6 is a composite of three separate views of the same element of this invention. FIG. 6A is a bottom perspective view of the wicking tray, 38, utilizable in this invention, while FIG. 6B is a top perspective view thereof, showing some of the wicking medium, 52, therein. FIG. 6C is a closeup side perspective view of some of the wicking cells, 50, covered over by a water permeable media [screening], 54, adhesed to wall, 46, that circumscribes the wicking medium, 52, as well as being adhesed to the dividers between cells (cups).

Wicking assemblage, 55, as shown in FIG. 6C, comprises a wicking tray, 38, having a plurality of plastic cups, called cells, 50, spaced from each other and all of which are integrated into a unitary structure by a wall, 46, that circumscribes the plurality of cups and which separates each adjacent cup filled with the wicking medium, 52. An easy analogy is to a tray of chocolate candies in a box or to a pony pack of starter plants such as tomatoes, peppers or other fruits and vegetables. Such plastic trays are available in the marketplace at very low cost. As per FIG. 6A, at least one or a plurality of perforations, 48, are to be found in the underside or bottom side of each individual cup. Here, in FIG. 6A, the wicking tray, 38, with the wicking medium, 52, therein, can be seen to be comprised of 30 such cups in a 5×6 arrangement. In FIG. 6A, the upright figure, the edge, 46, which constitutes a gluing surface for the screening, 54, is seen. In FIG. 6C, an after the fact FIGURE, the wicking assemblage, 55, which comprises the tray of a plurality of cells, 50, held together by the edging, 46, with the wicking material, 52, being perlite or vermiculite particles in each of the cells, with the screen glued in place. Any suitable adhesive may be employed, including a hot melt glue stick from a glue gun, which will hold the screening or other water permeable material, 54, to the edging, 46. Perlite and vermiculite are used in the gardening industry due to their ability to both absorb moisture and move it—capillary action.

Figure 7:
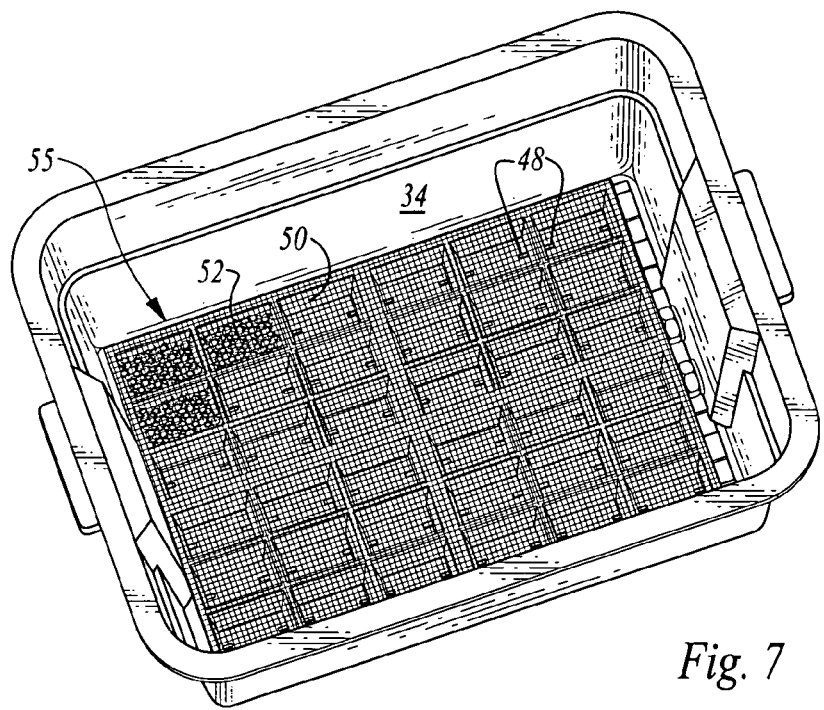
FIG. 7 is a top perspective view of the second container with a medium loaded wicking tray disposed therein.

FIG. 7 is a top perspective view of the wicking assemblage, 55, disposed within reservoir container #2's chamber, 34. The assemblage is NOT placed directly upon the bottom of the chamber, but rather upon the drain tray, 36. Thus the plurality of openings or perforations, 48, as seen in FIG. 6A, supra are raised slightly above the floor of the chamber, such that water can flow all around the individual cups to be taken up by the transfer material, the perlite or vermiculite or other moisture transfer material available in the marketplace.

While a moisture transfer material is the preferred loading for the individual cups, if certain plants to be disposed for watering within the confines of this invention, require less moisture than others, the cups beneath the lesser water requiring plants can be filled in part with Styrofoam™ beads, also known as packaging popcorn, to reduce the amount of water available to be taken up by the plant. Of course, once the screening is in place over the plurality of cups of the wicking medium, it will be necessary to remove the screening and to redo the gluing step, or prepare certain cups with less water transfer material by including the Styrofoam™ within the cups prior to the gluing step aforementioned.

Figure 8:
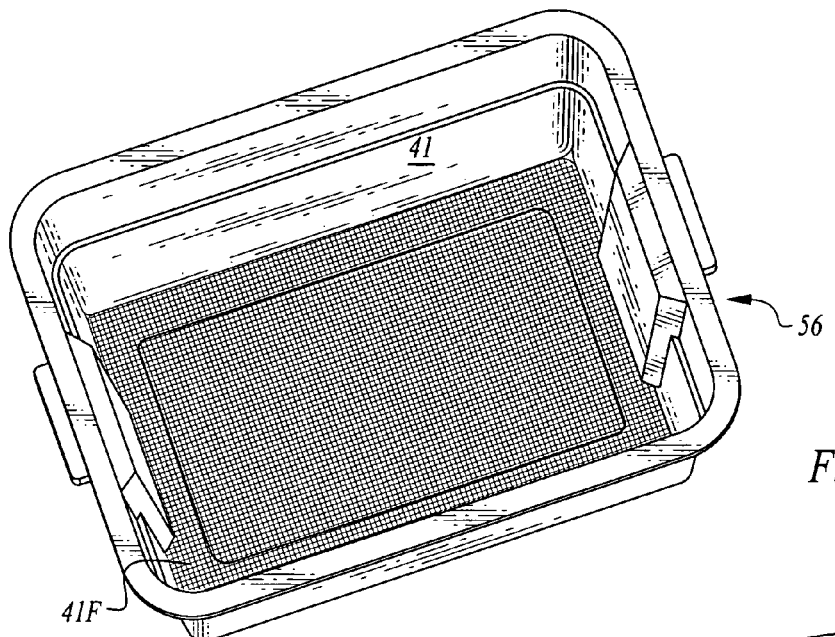
FIG. 8 is a top perspective view of the third container of this invention.

FIG. 8 is a top perspective view of container #3, designated 56. Container #3 may also have handles or be handle free. The same type of Rubbermaid® tub having a wider width and length at the top is also employed as container #3. Container # 3 has a significant amount of the chamber 41's floor, 41F, cut out and overlaid with adhesed screening, 54, that is water permeable. While window screening is operable, a preferred product is a geo textile. This material is preferred because it allows water to pass through, but will inhibit the intrusion of plant roots into the wicking medium. Of course, enough of the floor or base, 41F, must be retained to maintain dimensional stability of the container itself, 56. Again, a hot glue gun adhesive or other suitable adhesive may be employed for this purpose, see FIG. 10.

Figure 9:
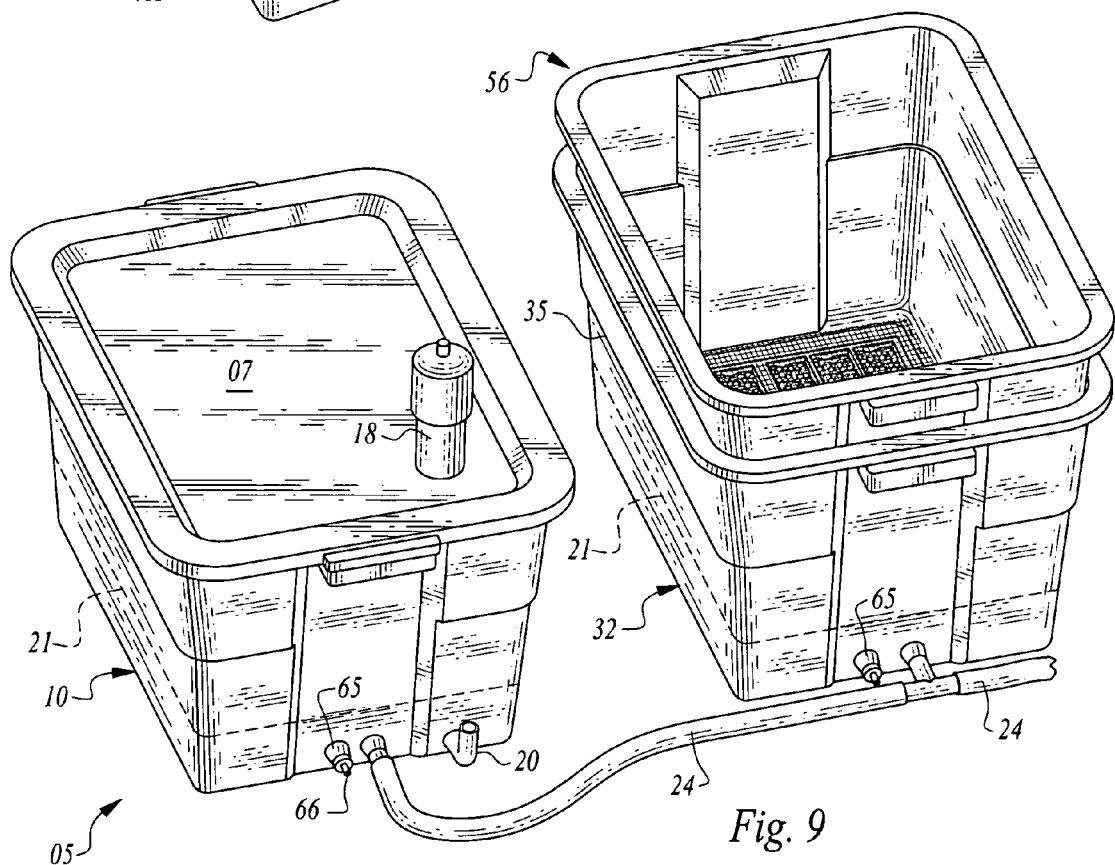
FIG. 9 is a top perspective view of the total invention assembled, ready for operation.

The discussion now turns to FIG. 9. Here the apparatus of this watering system is shown assembled almost ready for use. Contrast this figure with FIG. 10, which is an exploded view showing how all of the components fit together. FIG. 10 will be discussed subsequently.

In this FIG. 9, the container #3, 56, is shown with its smaller length and width, smaller bottom area nested within the higher area of container #2, 32. The bottom of container, 56, rests above the high water line, 21, which is the line noted below the upper wider longer area of container #2, element 32. This is to prevent the growing medium in container #3 from becoming overly saturated with water. This line of demarcation is designated 35. Note that the water level gauge, 22, is inserted into the opening in the lid, 07. Also note that the pot, 61, rests on the screen at the bottom of the container #3, such that it gets its moisture from the wicking tray, not from the surrounding growing medium.

FIG. 10 is an exploded view of an apparatus of the watering system of this invention, but for the water source container #1, while FIG. 11 is a fully assembled unit also but for container #1. The discussion will start at the top of FIG. 10 for a brief discussion of container #3 and its contents, but will then move to a discussion starting at the bottom of the figure as one would assemble this apparatus and work down, as this figure relates to the mode of assembly one would use to achieve the appearance of FIG. 9 on a patio or deck or other level surface, such as a driveway. However, the first container, which does not appear in this view, will be discussed briefly subsequent to the set up of container #3 within container #2.

Reference is now made to container #3. Layer, 60, is the growing medium which can be perlite, vermiculite, potting soil etc., disposed within the #3 container, 56. Plants such as 62, can be placed directly in the growing medium, 60, or in pots such as 61, with open bottoms such that moisture can be wicked upwardly. It is seen that on the side of container #3, there are 4 optional indicia, 57U, 59U, 57L and 59L. It is deemed preferable to pack the growing medium into container, 56, in two stages in order to eliminate air pockets to achieve maximum water transfer through the plants, be the plants in pots or directly in the growing medium. Thus, one places the potting mix or other plant growth material up to line 57L, and tamps it down to 59L, to remove air. The second amount is placed on top, up to line 57U, and then tamped down to line 59U.

We move to FIG. 11, and the assembly of the apparatus. Container #2, designated 32, is placed on a level surface, at the same elevation as the unseen container #1, the water level control container, 10. The drain tray, 36, with its series of channels and ridges, is cut to size as needed and is placed on the bottom of the container within the chamber, 40.

The base of the wicking tray, 38, with the wicking medium discussed supra and protected from spillage by the water permeable material, screening 54, is placed on to the drain tray, 36, in chamber, 40. This assemblage is designated 55. The lower or bottom part of the growing container, 56, container #3, is placed into the chamber of container #2, and will rest below the demarcation line, 35, seen in FIG. 11, which is where the lower chamber #2 tapers inwardly to its narrower and shorter extension, and rests on the wicking assemblage, 55's edge, 46.

Once the two containers are stacked together, the tubing, 24, is connected to the tee, 31, which may be open or closed, depending upon the number of units in line, as per discussion supra. An in line filter, not shown, may optionally be employed to prevent debris from passing from one full assembly to the next assembly of containers #3 and #2.

Using the Invention

Once the invention is set up as just described, automatic replenishment of water lost to evapotranspiration can be carried out on a consistent basis. Much of the growing medium, 60, can remain near saturation and the water level can remain fairly static approximate the high water level, 21, in all the containers #1 employed which if more than one, would be daisy chained together by tubing fluidly connected between them. The moisture content of the growing medium can vary due to the type of wicking medium employed. The reduction of moisture transferred can be enhanced by the substitution of styrene beads or other non capillary action material for part of the perlite, etc., as the load for the cells of the wicking tray, 38. Such a substitution will reduce the amount of water transferred, and may result in a dry down period, a phenomenon desired by certain plants.

Accumulated salts from the water or liquid fertilizers can be washed out of the growing medium in container #3 by back flushing water from an outside source downwardly instead of upwardly from the growing container #3 to the wicking medium disposed in container #2, in the wicking assemblage, 55, after the elbow, 20, is turned downwardly such that all flush water flows outwardly, rather than piling up in container #1.

Early on, it was stated that the amount of water in each container #2 would remain constant. Such is a true statement assuming that the amount of water in container #1 is greater than the amount of water needed to spread out to all of the assemblies of container #3 in container #2 that may be present in the system. The water moves across to all of the assemblies and the level is kept the same by physics, as water seeks its own level, as is well known. So the rise or elevation of water in each container #2 will be the same, provided that the containers #2 are on a level plane. The use of a hose for constant input of water to container, 10, the first container of this invention, 05, will ensure uninterrupted operation of the invention, 05. The float limits the amount of water coming in from the outside source into container #1, and thus also limits the rise of water in the containers #2.

Permutations and Combinations

It is seen that I have provided an easy to set up, low cost growing assembly, for use by apartment and home owners both, in small area locations. There can be one of these assemblies or many, all linked together by input water tubing, as may be desired. While not shown, a sight tube or other water elevation measurement device may be incorporated into container #1, using only ordinary skill in the art. In situations where storage is limited, the use of the sight tube or the elimination of the water level gauge will permit all three containers to be stacked together quite easily.

While I have suggested using three nestable Rubbermaid® plastic tubs as the three containers, other materials such as hard plastic, and stainless steel can also be used, as well as containers made from breathable materials, but at a greater financial cost. The three containers here are all the same shape, namely rectangular in cross section, but only #3 and #2 need be the same shape with the proviso that #3 can nest into the chamber of #2. Thus, a round shape for the #3 and #2 containers is just as suitable. Also the container #1 can be of a different size and configuration, such as cylindrical. But the #2 and #3 containers need not be nestable, just so long as the container #3 is able to undergo capillary action from container #2. Nestable containers #3 and #2 help ensure that water does not evaporate by keeping the moisture not absorbed by capillary action, from evaporating.

The minimum requirement of the multi-container system is one #1 container and one each of the #2 and #3 containers. But more than one of the #2 and #3 containers can be used in the same number, as well as one #2 container per plural #3 container. Also, more than one #1 container may be connected to the water source such as hose, but multiple #1 containers should not be connected to each other.

A timer can be placed in line with a hose to limit the water flow into container #1.

Plants may be placed in the growing medium either before or after container #3 is nested into container #2.

Previously the daisy chaining of multiple containers #2 has been mentioned. Of course, not only space is a limiting factor, but other factors such as slope of the patio or porch, and the amount of water available could be a limiting factor as well for example if there were to be only a single container #1.

One of the main benefits of this invention is that it facilitates the control of alternating wet and dry cycles. It is beneficial to most plants to have wet (saturated) periods alternating with dry periods. The system is set up to achieve this by facilitating control over the water level. Once the reservoir has been filled to the high water level, the float valve shuts off the water, at this point, the water supply to the float valve (the hose bib) can be shut off (manually or by timer). As water is used by the plant, the water level will lower to the low water level, which is the level where the water is no longer in contact with the wicking tray. By observing the height of the water level gauge, the user will know when the low water level has been achieved. From this point, the wicking and then growing mediums will begin to dry down. The user can decide to lengthen or shorten this period depending on the types of plants being grown.

It has been stated that there is to be a water transfer means between container #1 and container #2. This has been shown to be a tubing and nipple pairing. It is also within the scope of this invention to provide a relatively larger container #2 and a relatively smaller container #1 whereby container #1 can rest on the bottom of the chamber of container #2. One can merely use the nipple without the tubing to transfer water from container #1 to container #2. Of course, this requires the wicking assemblage to be sized such that it and container #1 can both rest on the bottom of container #2.

Since certain changes may be made to the above device without departing from the scope of the invention herein involved, it is intended that all matter contained in the above description and shown in the accompanying drawings shall be interpreted as illustrative only, and not in a limiting sense.

The invention claimed is:

1. A multi container system comprising:
    at least a first container, a second container, and a third container, each container having a chamber with a bottom therein;
    the first container having a water retaining chamber with a water input and a water output, the second container having a water transfer chamber in which a wicking tray, loaded with a wicking medium, is disposed on the bottom of said second chamber;
    wherein said wicking tray's wicking medium transfers water to plants disposed in a third container's plant receiving chamber by capillary action;
    the third container having a water permeable bottom, and being nestable within said second container;
    said first container water retaining chamber being fluidly connected to the second container for water transfer thereto;
    wherein when said third container, with the water permeable bottom, rests within the water transfer chamber of said second container, and said third container's bottom is in intimate contact with said wicking tray to receive water from said wicking tray, water passes by capillary action to said third container from said second container; and
    wherein each nested second and third container is not within any other second or third container.

2. The apparatus of claim 1, wherein a series of second containers' chambers are all fluidly linked to said first container.

3. The apparatus of claim 1, wherein the first container's chamber has a water self level means and an input flow control valve separate from said water self level means.

4. The apparatus of claim 1, wherein the wicking medium is selected from the group comprising perlite and vermiculite and a drain tray is present.

5. The apparatus of claim 1, further including an input water hose fluidly connected to the input of container 1, and having a timer in line with said hose to limit water input to the first chamber.

6. The apparatus of claim 1 further comprising a drainage tray disposed intermediate said wicking tray and the bottom of said chamber.

7. The apparatus of claim 6, wherein a series of second containers' chambers are all fluidly linked to said first container.

8. The apparatus of claim 6, wherein the first container's chamber has a water self level means and an input flow control valve separate from said water self level means.

9. The apparatus of claim 6, wherein the wicking medium is selected from the group comprising perlite and vermiculite and the drain tray is present.

10. A multi container system comprising:
    three containers, each container of which has a chamber with a bottom therein;
    the first container having a water retaining chamber with a water input and a water output;
    the second container having a water transfer chamber in which a wicking tray loaded with a wicking medium is disposed on the bottom of said second chamber;
    a drainage tray, disposed intermediate said wicking tray and the bottom of said water transfer chamber, wherein said wicking tray's wicking medium transfers water to plants disposed in a third container's plant receiving chamber, by capillary action;
    the third container having a water permeable bottom, and being disposed within said second container;
    said first container's chamber being fluidly connected to second container for water transfer thereto, and said first container having an adjustable overflow port to limit the height of the water therein;

wherein when said third container bottom rests within the water transfer chamber of said second container and said third container's bottom is in intimate contact with said wicking tray, water passes from said wicking tray to plants disposed in said third container; at least one additional second container, each additional second container having an additional third container nested therein, all of said second containers being fluidly connected to said first container, each nested second and third container not within any other second or third container.

11. The apparatus of claim 10, wherein the containers are all the same height, width, and depth and are made of plastic.

12. The apparatus of claim 10, wherein the chamber of the third container is filled with a member selected from the group comprising perlite, vermiculite, and potting mix.

13. The apparatus of claim 10, wherein the plants are in pots having open bottoms in contact with the water permeable bottom of the chamber of said third container.

14. The apparatus of claim 10, wherein the first container's chamber has an input flow control valve separate from a water self level means.

15. The apparatus of claim 14, wherein the first container has a removable lid to prevent evaporation of water in its chamber.

16. A multi container system as in claim 10, wherein the system includes an equal number of second and third containers, said number being at least 2, and each pair of second and third containers being fluidly connected to said first container, each second container not within any other second or third container.

17. The apparatus of claim 16, wherein the first container includes a water level indicator a float valve to control water input, and wherein at least one of said containers comprises a water input opening and a separate water output opening.

18. The apparatus of claim 10, wherein the first container includes a water level indicator and a float valve to control water input.

19. A multi container system as in claim 10, wherein the system includes at least one first container, a number of second containers, and at least the same number of third containers, said number being at least 1, each second container not within any other second or third container, and each second container being fluidly connected to said first container.

20. A process for watering plants disposed in a multi container system, which system comprises at least three containers, a first container, and the same number of second and third containers;
  each container of which has a chamber with a bottom therein;
  the first container having a water retaining chamber with a water input and a water output,
  and each second container having a water transfer chamber;
  a) placing a wicking assemblage comprising a wicking tray loaded with a wicking medium on the bottom of each said second container's chamber;
  b) placing a drainage tray, intermediate said wicking tray and the bottom of said second chamber, wherein said wicking tray's wicking medium can transfer water to plants disposed in each said third container's chamber, by capillary action, regardless of the presence of a drainage tray;
  c) placing a third container having a water permeable bottom, and being nestable within said second container, in said second container in intimate contact with said wicking tray;
  d) fluidly connecting said first container's chamber to each second container chamber, for water transfer thereto;
  e) placing plants in a planting medium in said third container's chamber such that the third container's water permeable bottom is in intimate contact with said wicking assemblage, and;
  f) permitting water to pass from said wicking tray to the plants disposed in each said third container by capillary action; wherein each nested second and third container is not within any other second or third container.

21. The process of claim 20 wherein step c) and step e) are carried out in reverse order.

* * * * *